March 15, 1938.  C. F. WALZ  2,111,343
CONNECTER STRIP AND FROST SHIELD USING THE SAME
Filed May 23, 1936  2 Sheets-Sheet 1
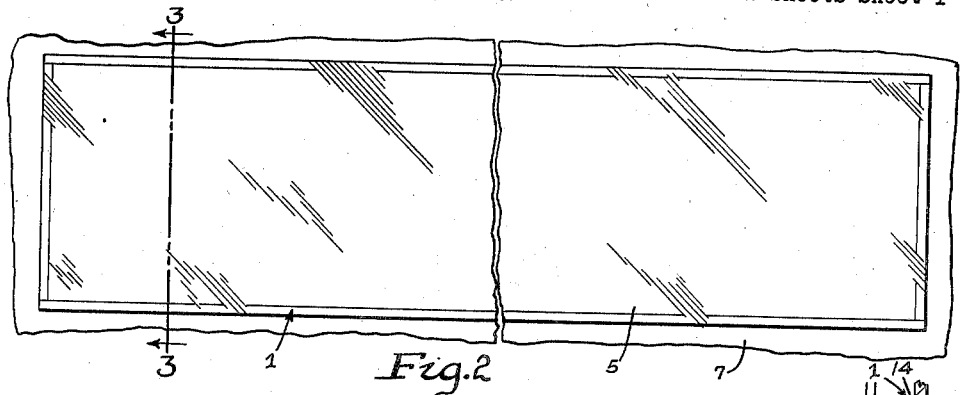
Fig.2
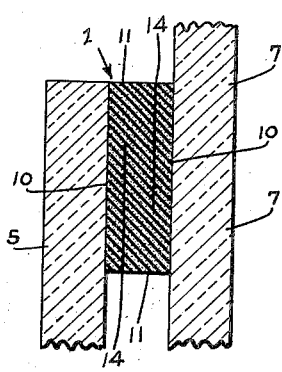
Fig.4
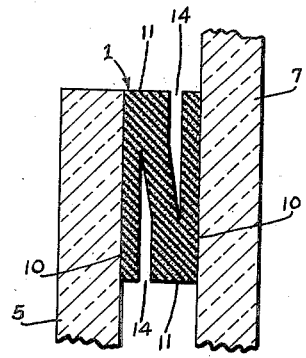
Fig.5
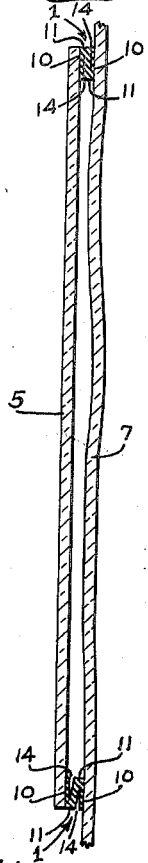
Fig.3
Fig.6
Fig.7
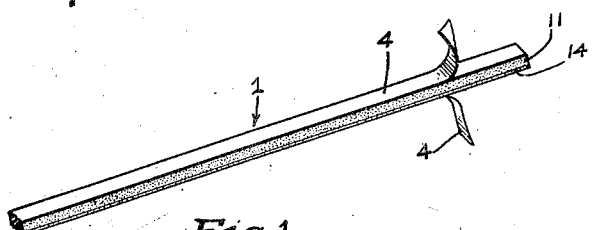
Fig.1
INVENTOR
CARL F. WALZ
BY
ATTORNEYS March 15, 1938.                C. F. WALZ                2,111,343
CONNECTER STRIP AND FROST SHIELD USING THE SAME
Filed May 23, 1936                    2 Sheets-Sheet 2

INVENTOR
CARL F. WALZ
BY Paul, Paul Moore
ATTORNEYS

Patented Mar. 15, 1938

2,111,343

UNITED STATES PATENT OFFICE 2,111,343

CONNECTER STRIP AND FROST SHIELD USING THE SAME

Carl F. Walz, Minneapolis, Minn.

Application May 23, 1936, Serial No. 81,480

9 Claims. (Cl. 20—40.5)

This invention relates to a device for obtaining and maintaining continued adhesive and sealing juncture between two relatively stiff transparent plates. The device is particularly adapted for connecting clear vision shields, of the dead-air-space type, to automobile windshields.

The main difficulty incident to the use of clear vision shields of the dead-air-space type is that concerned in securing the shield to maintain the seal, that is to prevent entry of any air whatsoever into the dead-air-space, which entry, of course, lessens or destroys the efficiency of the device as a clear vision maintainer.

The better and more efficient kind of shield is that of the ready-to-use type in which the glass has already attached thereto a functionally continuous strip of rubber or equivalent material, to which tacky adhesive is already applied or to which a suitable adhesive can be applied. The shield is then applied by simply pressing the adhesively coated strip against the windshield or equivalent transparent surface. Pressure is applied progressively and marginally against the outer face of the shield.

It frequently happens (due to unevenness of either glass) that pressure applied to one part will cause the glass to be put under strain so that the partly set adhesive of a previously pressed and adherent portion of the strip is pulled away, to such an extent as to admit air. By use of the present invention, this strain is avoided, as well as the breaking of the seal. Moreover, these devices are frequently attached by unskilled or careless persons who do not apply sufficient pressure, or do not apply the pressure over a sufficient length of time to obtain good adhesive juncture at one portion, before they apply pressures to the succeeding portions. The present invention prevents accidents, due to any of the above causes, by providing a strip construction which can yield sufficiently to relieve pulling strain on the partly set adhesive, and thus prevent air-leak-producing stripping of the adhesive.

Features of the invention include all details of construction, along with the broader ideas of means inherent in the disclosure.

Objects, features and advantages of the invention will be set forth in the description of the drawings forming a part of this application, and in said drawings—

Figure 1 is a view of a piece of strip material constructed in accordance with this invention, and showing the adhesive protecting material pulled back at one end;

Figure 2 is a front view of a portion of a windshield having a clear vision shield attached thereto by the use of the material of Figure 1;

Figure 3 is a cross-section on line 3—3 of Figure 2 showing the action of my material in preventing stripping of the adhesive;

Figure 4 is an enlarged detail cross-section illustrating the normal condition of the strip after adhesive connection;

Figure 5 shows the compensatory action of the strip allowing substantial movement of the shield in direction perpendicular to the surface to which it is attached, and without breaking the seal;

Figure 6 is an end view of a modified form of strip;

Figure 7 is an end view of another modified form of strip, illustrating both the strip and its method of formation;

Figure 8:
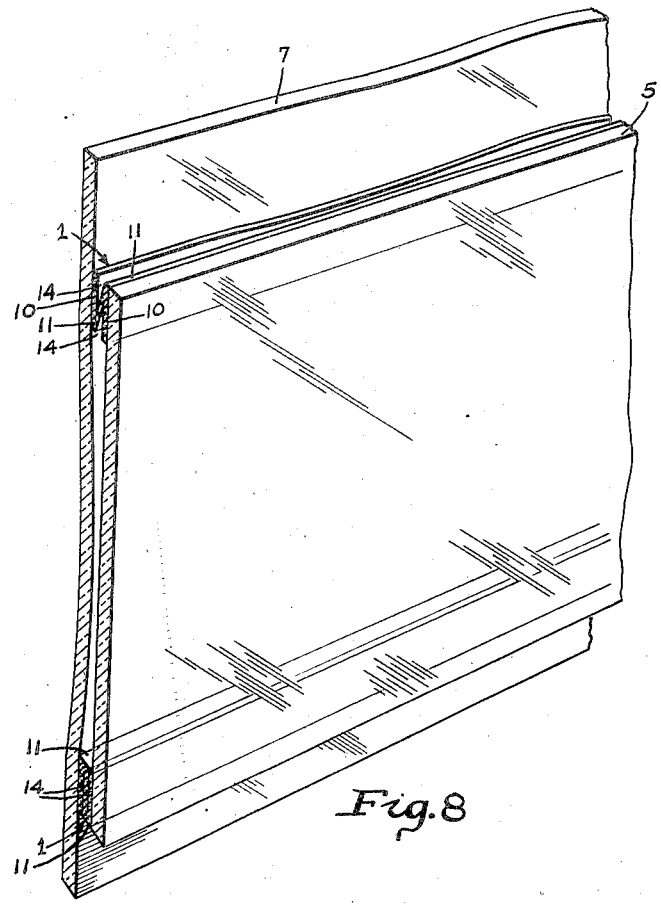
Figure 8 is a sectional perspective view, supplemental to Figure 3, and illustrating the application of the device to a warped windshield.

Referring first to Figure 1: The numeral 1 generally indicates a strip made of suitable compressible elastic material, such as sponge rubber. When sponge rubber is used, it is best to treat each of two opposite faces to provide a non-adhesive-absorbent skin layer, not herein shown. Two opposite faces, whether previously treated or not, are preferably covered with tacky adhesive, not shown. The tacky adhesive is covered with Holland cloth or other equivalent material indicated at 4 and when it is desired to apply the strip, the Holland cloth is removed and one of the adhesively coated surfaces is pressed against plate 5 which is to be attached to the windshield or other surface, indicated at 6.

The strip material can be sold as a ready-to-use article with the adhesive already applied, or the adhesive can be applied by the user.

Although the specific construction of the device herein is claimed per se, there is no intention to entirely limit the invention thereto because I believe myself the first to provide any means which will perform the function herein disclosed, in relation to the non-leak attachment of relatively stiff plates of any character, or in any environment, and in dead-air-space-maintaining relation, or in any other relations, in which it is desirable to prevent detachment or stripping of an adhesively secured strip, or in which stripping is to be avoided before the adhesive is thoroughly set. I not only claim the material, but also claim the shield as a ready-to-use article, equipped with my new material.

Ordinarily, these shields 5 are composed of a piece of glass which either has a dimension of about 8 x 18 inches and weighs about 1 pound 2½ ounces; or a piece of glass about 8 x 36 inches, which weights about 2 pounds 5 ounces. Since these shields are attached to windshields which are practically vertical or are slanted slightly from the vertical, and since ordinarily they are attached by means of a tacky adhesive, the weight of the shield has a tendency to pull the adhesive loose before it has time to set. Moreover, using this adhesive there is frequently a tendency to pull the adhesive loose, at one point or another, because in applying the glass, the same has been bent and, therefore, put under tension or strain.

In the present embodiment, the strip 1 is of four-sided configuration providing two opposite faces 10 of greatest area which are adapted to be adhesively attached, and having other faces 11 of substantially less area. Inwardly from each of faces 11, the material is slitted as at 14, the slits extending, in this instance, substantially more than half way through the material. In this instance also, the slits are parallel with one another and with the adhesively-attachable faces 10. When the shield is attached with the strip and when outward expansion takes place, the cross-sectional configuration is somewhat N-shaped.

In the shield, as sold, narrow strips are arranged marginally of the glass and are attached by one face 10 to the shield 5 with suitable adhesive, not shown. The opposite face 10 is also provided with suitable, preferably tacky adhesive, and this adhesive is covered with Holland cloth. After stripping off the cloth, the shield is applied by pressure.

The strips must be so applied as to form a functionally continuous ring. Heretofore, proper sealing has not been unfailingly obtainable under conditions where the surface to which the shield is attached has been uneven, or not strictly flat, as, for example, when operating with windshields constructed of shatter-proof glass. Heretofore, because of this unevenness, when adhesive-attaching pressure was applied at any point along the shield, a portion of the strip at some other point pulled away, due to tension or strain under which the bent glass was put, or due to rocking motion of the glass, and in so pulling away, the partially set adhesive gave way and a leak resulted.

Sometimes this pulling away may be over only a very small area of the strip, but it is sufficient to break the seal and render the device substantially useless for its intended purpose. The present device allows a compensating outward motion of the spacing and connecting element, and corresponding motion of the attached plate or seal, all without any breaking of the seal either between the plate and the strip or between the strip and the windshield.

Figure 6 represents a modification in which a cross-sectionally rectangular strip is shown. The strip is adapted to be pulled out in the manner shown in Figure 5, but the strip is M-shaped, instead of N-shaped. To this end, the strip is slitted inwardly as at 20 from one end, then slitted inwardly on its midline as at 21 from the opposite end, then slitted inwardly from the first mentioned end, as indicated at 22. This form has certain advantages in regard to degree of expandibility.

The showing of Figure 7 is somewhat diagrammatic but illustrates a form in which the strip is made from sheet material of suitable quality, such as rubberized fabric, or an ordinary sheet of rubber or from material which is air and water-proof. Whatever type of material is used, the same is folded, as shown in the figure, to provide three (or more) portions 25, 26 and 27. It is, of course, understood it may be folded to provide a greater (even a lesser) number of portions. Before or after folding, there is inserted between each of two contiguous portions, for example between portions 25 and 26, or between portions 26 and 27, suitable plates 28. In lieu of the plates, the material can be dusted or treated, the purpose being to prevent attachment of the material while the material is treated at the bends to prevent unfolding. When vulcanization is necessary to prevent unfolding, a plate can be applied and then heat applied to vulcanize the end portions 30. The object is to produce a strip composed of portions which remain against one another until the strip is used as an attaching means, whereafter it can yield, due to the separability of the layers. Talc or other dusting powder may be used to condition the portions to be pulled apart, but to prevent unfolding and to maintain the parallel face-to-face contact of the elements 25, 26 and 27. Vulcanization, or other suitable treatment, may be said to act to "set" the bends.

There is no intention to limit the invention by any recitation of the use of the article. This strip material may be used for any purpose for which it is adapted. It is conceivable that, for some uses, the material of the strip need not necessarily be impervious to air or water, providing that the strip is so made as to allow for expansion or extension after attachment, and so that the expandible parts are normally held in closed position when the strip is sold, and before attachment, and after attachment, except when expansion is needed.

Figure 9:
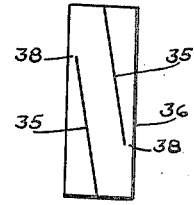
Figure 9 is an end view showing a modification of the strip.

In the modification of Figure 9, the slits 35 of the strip are diagonal with respect to the front and rear sides 36—37 whereby a relatively thin layer 38 of material is provided adjacent the inner end of each slit. This construction makes for greater flexibility. The slitting is so accomplished as not to tear through but so as to reduce to the minimum the strain exerted on the adhesive when expansion is necessary to relieve strain or tension on either shield. Of course, the less strain exerted during expansion, the less likely is the adhesive to be pulled loose. In other words, it is best to have it thinned out at the points 38 to allow it to extend with as little strain on the adhesive as possible. This is a valuable feature.

Figure 10:
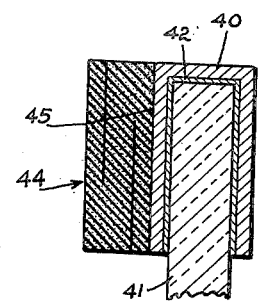
Figure 10 is a sectional view showing one of the strips of the present invention applied to a frame which marginally circumscribes and sealingly embraces the glass of the frost-shield.

In Figure 10, the numeral 40 indicates a frame of metal or other suitable material circumscribing the frost-shield glass 41, and the numeral 42 indicates a piece of rubber or a piece of felt interposed between the frame 40 and the glass to make an air-tight seal. The connecter strip generally indicated at 44, is secured to the face 45 of the frame by suitable cement, not shown. It is, of course, understood that any suitable form of strip, made in accordance with the teachings of this invention, can be used in conjunction with the frame, and the combination with the frame is a feature of the invention. The frame 40 may be of rubber or other suitable material in which case no felt nor rubber strip 42 need to be interposed. The windshield has not been shown in Figure 10.

Figure 11:
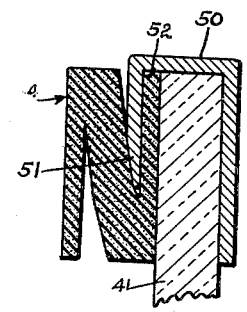
Figure 11 is another modification in which the improved strip is applied to a frame which is sealingly clampingly mounted on the frost-shield.

In Figure 11, frame 50 is shown which has a clip-like extension 51 clampingly or compressively engaging the inner leg 52 of the strip 44. In this form, the windshield has not been shown attached, but is is assumed that the strip has been expanded due to inequalities in one of the glasses, and to relieve the strain.

Figure 12:
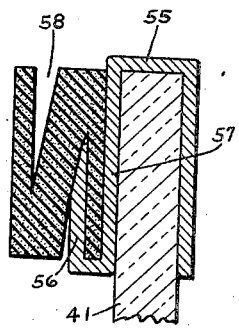
Figure 12 is another modification in which the strip is applied to a frame which embraces the frost-shield.

Figure 12 is another modification in which a frame 55 is used, which frame has a clip-like extension 56 which also enters the slit. In this instance, however the clip is formed terminally by rebending an inner portion 57 of the frame 55 as shown, and the upwardly opening slit 58 of the strip is spaced from the inner face of the shield 41, instead of lying immediately adjacent thereto as in Figure 11.

Figure 13:
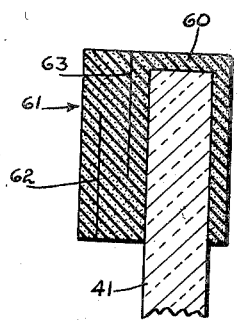
Figure 13 is a view showing a one-piece frame and strip.

In Figure 13, the sealing is obtained by means of a frame-like portion 60 of the same material as the strip which is integral with an expansible portion generally indicated at 61. This expansible portion is made expansible, in this instance, by slitting as at 62—63 and this means for obtaining expansion generally corresponds to the means shown in the other figures of the drawings, with the exception of Figure 9. It will be understood that there is no intention to limit the invention entirely to the specific means for obtaining expansion, and that I broadly claim all means other than the natural quality of the material itself.

It will, of course, be understood that the principal object is to relieve any tension on either the windshield glass or the frost-shield glass. The windshield, as well known, is generally under a certain amount of tension, and particularly is this true of shatter-proof glass. Neither of the glasses should be under tension. It is well known that glass, even under slight tension, is much more likely to be broken by a sudden blow or by jarring than when it is free of tension.

I claim as my invention:

1. A connecter strip having therein two longitudinal slits, one extending inwardly from each of two opposite faces.

2. A connecter strip having four faces and composed of compressible material and having two longitudinal slits, one extending inwardly from each of two opposite faces, each slit extending to a point beyond a line which is midway between the faces.

3. A four-sided connecter strip of sponge rubber capable of being adhesively attached by each of two opposite faces, and having slits extending the full length thereof, one extending inwardly from each remaining opposite face, said slits being substantially parallel with the last mentioned faces.

4. A connecter strip adapted for adhesive attachment, and composed of material capable of expansion when released after being compressed, and means other than the expansible quality of the material rendering said strip capable of additional expansion in the same direction when entrainingly acted upon.

5. A strip normally having a substantially rectangular configuration, and means rendering the strip capable of expansion to have a cross-sectionally N-shaped configuration.

6. A clear vision shield of the dead-air-space type having a flat surfaced attaching and sealing strip mechanically modified to allow substantial movement of the attached shield in a direction away from the surface to which it is attached, without breaking the seal, said strips being marginally placed, and functionally continuous and being composed of compressible elastic material.

7. A strip adapted for connecting two bodies together, and adapted for attachment by each of two opposite sides and having means located intermediately of said sides permitting the strip to yield a substantial distance in a direction away from said sides when attached thereby.

8. A strip adapted for connecting two bodies together, and adapted for attachment by each of two opposite sides and having means located intermediately of said sides permitting the strip to yield throughout its length a substantial distance in a direction away from said sides when attached thereby.

9. A clear vision shield of the dead-air-space type comprising, a transparent member having a strip sealingly attached by one face to one face of the member, and adapted to be adhesively attached by the other face to a surface and said strip having means located intermediately of its attaching faces permitting it to yield a substantial distance in a direction away from said faces when the device is attached.

CARL F. WALZ.